(12) United States Patent
Suzuki et al.

(10) Patent No.: US 9,955,321 B2
(45) Date of Patent: Apr. 24, 2018

(54) REGROUPING PUSH-TO-TALK GROUPS

(71) Applicant: BLACKBERRY LIMITED, Waterloo (CA)

(72) Inventors: Takashi Suzuki, Ichikawa (JP); Eswar Vutukuri, Havant (GB); Rene Faurie, Versailles (FR)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/681,495

(22) Filed: Apr. 8, 2015

(65) Prior Publication Data
US 2016/0302048 A1 Oct. 13, 2016

(51) Int. Cl.
*H04W 4/10* (2009.01)

(52) U.S. Cl.
CPC .................................... *H04W 4/10* (2013.01)

(58) Field of Classification Search
CPC ................................. H04W 4/08; H04W 4/10
USPC .................................................. 455/518–521
See application file for complete search history.

(56) References Cited

U.S. PATENT DOCUMENTS

| | | | |
|---|---|---|---|
| 7,336,659 B2* | 2/2008 | Meago | H04L 12/185 370/390 |
| 2003/0223381 A1* | 12/2003 | Schroderus | H04L 12/1868 370/285 |
| 2005/0180394 A1* | 8/2005 | Kautz | H04L 12/5692 370/352 |
| 2008/0155106 A1 | 6/2008 | Hans | |
| 2012/0170547 A1* | 7/2012 | Oprescu-Surcobe | H04W 36/0072 370/331 |
| 2013/0007287 A1* | 1/2013 | Chu | H04L 12/189 709/227 |
| 2014/0071878 A1* | 3/2014 | Xu | H04L 12/189 370/312 |
| 2015/0131510 A1* | 5/2015 | Gilbert | H04W 72/005 370/312 |

FOREIGN PATENT DOCUMENTS

WO  2006011770  2/2006
WO  WO 2014069982 A1 * 5/2014

OTHER PUBLICATIONS

3GPP TS 22.179 V13.1.0; 3rd Generation Partnership Project; Technical Specification Group Services and System Aspects; "Mission Critical Push to Talk (MCPTT) over LTE"; Stage 1, Release 13; Mar. 2015; 76 pages.
3GPP TS 23.007; 3rd Generation Partnership Project; Technical Specification Group Core Network and Terminals; "Restoration Procedures"; Release 13; Mar. 2015; 93 pages.
(Continued)

*Primary Examiner* — Raymond Dean
(74) *Attorney, Agent, or Firm* — Trop, Pruner & Hu, P.C.

(57) ABSTRACT

A network node communicates data of a first push-to-talk (PTT) group using a first multimedia broadcast/multicast service (MBMS) bearer, and data of a second PTT group using a second MBMS bearer. Responsive to a regrouping of the first PTT group and the second PTT group to form a regrouped PTT group, the network node communicates data of the regrouped PTT group using at least one of the first and second MBMS bearers.

21 Claims, 7 Drawing Sheets

(56) References Cited

OTHER PUBLICATIONS

3GPP TS 23.246 V13.0.0; 3rd Generation Partnership Project; Technical Specification Group Services and System Aspects; Multimedia Broadcast/Multicast Service (MBMS); "Architecture and Functional Description"; Release 13; Mar. 2015; 68 pages.
3GPP TS 23.468 V12.4.0; 3rd Generation Partnership Project; Technical Specification Group Services and System Aspects; "Group Communication System Enablers for LTE (GCSE_LTE)"; Stage 2, Release 12; Mar. 2015; 28 pages.
3GPP TS 25.446 V12.1.0; 3rd Generation Partnership Project; Technical Specification Group Radio Access Network; "MBMS Synchronisation Protocol (SYNC)"; Release 12; Dec. 2014; 22 pages.
3GPP TS 29.061 V12.9.0; 3rd Generation Partnership Project; Technical Specification Group Core Network and Terminals; "Interworking Between the Public Land Mobile Network (PLMN) Supporting Packet Based Services and Packet Data Networks (PDN)"; Release 12; Mar. 2015; 168 pages.
3GPP TS 29.061 V13.0.0; 3rd Generation Partnership Project; Technical Specification Group Core Network and Terminals; "Interworking Between the Public Land Mobile Network (PLMN) Supporting Packet Based Services and Packet Data Networks (PDN)"; Release 13; Mar. 2015; 168 pages.
3GPP TS 29.274 V13.1.0; 3rd Generation Partnership Project; Technical Specification Group Core Network and Terminals; 3GPP Evolved Packet System (EPS); Evolved General Packet Radio Service (GPRS) Tunnelling Protocol for Control Plane (GTPv2-C); Stage 3, Release 13; Mar. 2015; 317 pages.
3GPP TS 29.281 V12.1.0; 3rd Generation Partnership Project; Technical Specification Group Core Network and Terminals; General Packet Radio System (GPRS) Tunnelling Protocol User Plane (GTPv-U); Release 12; Dec. 2014; 27 pages.
3GPP TS 36.300 V12.5.0; 3rd Generation Partnership Project; Technical Specification Group Radio Access Network;"Evolved Universal Terrestrial Radio Access (E-UTRA) and Evolved Universal Terrestrial Radio Access Network (E-UTRAN)"; Overall Description; Stage 2, Release 12; Mar. 2015; 251 pages.
3GPP TS 36.331 V12.5.0; 3rd Generation Partnership Project; Technical Specification Group Radio Access Network; Evolved Universal Terrestrial Radio Access (E-UTRA); Radio Resource Control (RRC); "Protocol Specification"; Release 12; Mar. 2015; 445 pages.
3GPP TS 36.443 V12.2.0; 3rd Generation Partnership Project; Technical Specification Group Radio Access Network; Evolved Universal Terrestrial Radio Access Network (E-UTRAN); "M2 Application Protocol (M2AP)"; Release 12; Mar. 2015; 89 pages.
3GPP TS 36.444 V12.2.0; 3rd Generation Partnership Project; Technical Specification Group Radio Access Network; Evolved Universal Terrestrial Radio Access Network (E-UTRAN); "M3 Application Protocol (M3AP)"; Release 12; Mar. 2015; 64 pages.
3GPP TSG RAN WG2 #87, R2-143108; Backwards Compatible Introduction of Shorter MCH Scheduling Period and MCCH Modification Period; Source: ZTE, CMCC, CATR, Qualcomm, CATT; Agenda item: 7.9.1; Document for: Discussion and Decision; Dresden, Germany, Aug. 18-22, 2014; 6 pages.
HiSilicon Huawei, Huawei Technologies Co., Ltd.; Agenda item: 14.1.2; Document for: Information; "RP-141920: Motivation of Rel-13 New Study Item Proposal for Support of Single-Cell Point-to-Multipoint Transmission in LTE"; 2011; 18 pages.
3GPP TSG RAN, Meeting #66, RP-142205; Source: HiSilicon Huawei; "New Study Item Proposal for Support of Single-Cell Point-to-Multipoint Transmission in LTE"; Document for Approval; Agenda Item 14.1.2; Maui, Hawaii; Dec. 8-11, 2014; 6 pages.
H. Holbrook et al., Network Working Group, Request for Comments: 4607, Category: Standards Track, Source-Specific Multicast for IP, Aug. 2006 (19 pages).
H. Holbrook et al., Network Working Group, Request for Comments: 4604, Updates: 3376, 3810, Category: Standards Track, Aug. 2006 (11 pages).
P. Calhoun et al., Network Working Group, Request for Comments: 3588, Category: Standards Track, Sep. 2003 (147 pages).
Open Mobile Alliance LTD (OMA)—OMA PoC Multicast, Approved Version 2.1—Aug. 2, 2011 (62 pages).
European Patent Office, Partial European Search Report for EP Appl. No. 15162847.6 dated Sep. 18, 2015 (6 pages).
European Patent Office, Extended European Search Report for EP Appl. No. 15162847.6 dated Jan. 27, 2016 (10 pages).

* cited by examiner

REGROUPED GROUP (250)

REGROUPED GROUP (252)

REGROUPING PUSH-TO-TALK GROUPS

BACKGROUND

A push-to-talk (PTT) service allows two or more users to engage in communications in which permissions are granted to the users to speak in an arbitrated manner. A user can seek permission to speak by pressing a button on a user equipment (UE) or by activating another control element.

BRIEF DESCRIPTION OF THE DRAWINGS

Some implementations are described with respect to the following figures.

DETAILED DESCRIPTION

Figure 1:
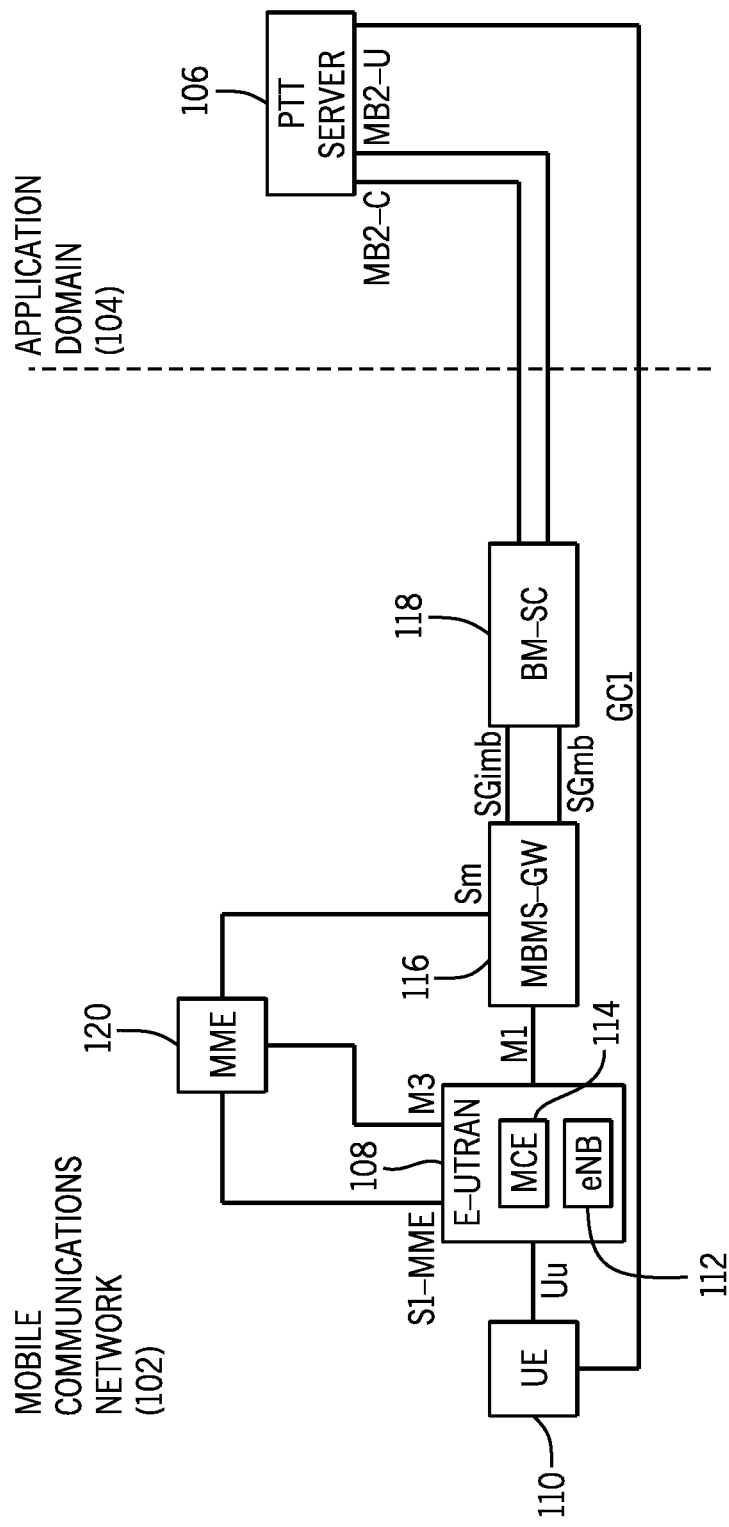
FIG. 1 is a block diagram of an example network arrangement according to some implementations.

A push-to-talk (PTT) service can be provided by a PTT server (or multiple PTT servers). In some cases, a PTT server can also be referred to as a PTT over Cellular (PoC) server. The PTT server performs arbitration to determine which of multiple user equipments (UEs) of a PTT group has permission to perform transmission of data (e.g. voice data and/or video data). A UE can request permission to transmit in response to a user activating a control element (such as a button) of the respective UE.

In some implementations, a mobile communications network in which a PTT service is provided can operate according to the Long-Term Evolution (LTE) standards as provided by the Third Generation Partnership Project (3GPP). The LTE standards are also referred to as the Evolved Universal Terrestrial Radio Access (E-UTRA) standards. Although reference is made to LTE or E-UTRA in the ensuing discussion, it is noted that techniques or mechanisms according to some implementations can be applied to other wireless access technologies, such as 5G (fifth generation) technologies or other access technologies.

In an LTE network, one type of PTT service is referred to as a mission critical PTT (MCPTT) service, suitable for mission critical scenarios (such as emergency services including police services, fire department services, etc.). In other examples, PTT services can include non-mission critical PTT services, which can be used by other types of users (such as utilities and transportation services). A PTT service in a mobile communications network such as an LTE network can build on existing 3GPP network communication mechanisms to establish, maintain, and terminate communication paths among UEs of a PTT group. In a mobile communications network that implements an MCPTT service, a PTT server can also be referred to as an MCPTT server.

A PTT group can include a group of UEs (associated with respective users) that are able to perform PTT communications with each other. As an example, a PTT group can include the police department of a given city, or a subset of the police department of the given city. Other examples of PTT groups can include the fire department, employees of a company, a social group, and so forth. In a mobile communications network that implements a MCPTT service, a PTT group can be referred to as a MCPTT group.

In some cases, regrouping can be performed, where existing PTT groups are modified to form different PTT groups. For example, two or more PTT groups can be combined (or merged) as part of the regrouping. A PTT group that is formed as a result of regrouping existing PTT groups can be referred to as a "regrouped PTT group" (or more simply "regrouped group").

Regrouping can be performed for various different reasons. As an example, in response to an incident in a particular geographic area, it may be desirable to allow users of different PTT groups to communicate with each other to perform coordination, such as to allow the police department and fire department to communicate with each other when a natural disaster or a man-made disaster occurs. After the incident has been resolved, the regrouping can be cancelled, and users can proceed with PTT communications in their originally configured PTT groups.

In some implementations of the present disclosure, communications in a PTT group can employ a Multimedia Broadcast/Multicast Service (MBMS) bearer service (or more simply MBMS service) or a unicast (point to point) bearer service. Using a MBMS service, a wireless access network node can transmit (broadcast or multicast) the same data to multiple UEs in a PTT group concurrently. MBMS in an LTE access network (also referred to as an E-UTRAN) is referred to as eMBMS, and is described in 3GPP Technical Specification (TS) 36.300.

MBMS can also be supported by other types of access networks, including a GSM (Global System for Mobile Communications) EDGE (Enhanced Data Rates for GSM Evolution) Radio Access Network (GERAN) or an UMTS (Universal Mobile Telecommunications System) Terrestrial Radio Access Network (UTRAN). Although reference is made to specific types of access networks, it is noted that in other examples, access networks according to other technologies can be employed. In the ensuing discussion, "MBMS" can refer to eMBMS used in an E-UTRAN, or MBMS used in a GERAN or UTRAN. More generally, "MBMS" can refer to any type of multicast service in which data can be broadcast or multicast to multiple UEs of a given PTT group concurrently.

Each PTT group can be served by a respective MBMS service. An MBMS service for a given PTT group can include one or multiple MBMS sessions. Each MBMS session employs a respective MBMS bearer, which is used to carry data for communications of UEs of the PTT group for the given MBMS session. Multiple different MBMS sessions of a specific MBMS group can employ respective different MBMS bearers.

A Temporary Multicast Group Identity (TMGI) can be used to identify a specific MBMS service inside a corresponding Public Land Mobile Network (PLMN), which can be a mobile communications network provided by a specific network operator. Multiple PLMNs can be provided by one or more network operators.

As an example, the MBMS service for a first PTT group (G1) can be identified by TMGI_G1, while the MBMS service for a second PTT group (G2) can be identified by TMGI_G2. A specific MBMS session of a given MBMS service can be identified by a combination of an MBMS session identity and a TMGI (that identifies the given MBMS service). The UEs belonging to the PTT group G1 or G2 can receive information about each respective MBMS session over a Multicast Control Channel (MCCH), and UEs can configure an MBMS point-to-multipoint bearer (MRB) to receive data of the MBMS session.

In some examples, to perform regrouping of PTT groups (including combining PTT groups), a new MBMS service can be created by assigning a new TMGI for the combined group, where the new MBMS bearer service can cover the combined service areas of PTT groups G1 and G2. However, creating a new MBMS service (which would include providing notifications of a new MBMS bearer and/or a new TMGI) over the MCCH can be associated with a relatively large latency, such as on the order of a few seconds. This latency is associated with the period of time involved in performing modification of the MCCH. Such latency can result in poor user experience, and may not be acceptable in many use cases.

The MCCH is a logical channel used by an MBMS service to carry control information about a downlink channel between a wireless access network node and a UE. An MBMS service also uses the following channels, including a Multicast Channel (MCH), which is a transport channel that carries a Multicast Transport Channel (MTCH), where the MTCH is a logical channel that carries bearer data (e.g. voice data and/or video data) that is to be broadcast or multicast to UEs.

In accordance with some implementations, to reduce latency associated with performing regrouping of PTT groups, techniques or mechanisms are provided that allow for regrouping without having to perform modification of the MCCH, where the modification of the MCCH is due to creating a new MBMS service and assigning a new TMGI for the new MBMS service. Rather, an existing MBMS service (and an MBMS bearer associated with the existing MBMS service) can be employed for performing data communications associated with the regrouped PTT group. More generally, one or more existing MBMS services (and one or more associated MBMS bearers) can be employed for performing data communications corresponding to the regrouped PTT group.

FIG. 1 depicts an example network arrangement that includes a mobile communications network 102 and an application domain 104. The application domain 104 includes a PTT server 106 (or multiple PTT servers). The mobile communications network 102 can also be referred to as a PLMN. In examples according to FIG. 1, the mobile communications network 102 is an LTE network that includes network nodes that operate according to the LTE standards.

In other examples, the mobile communications network 102 can operate according to other standards.

The mobile communication network 102 includes an E-UTRAN 108 (a radio access network that operates according to the LTE standards), which includes wireless access network nodes to communicate wirelessly with UEs 110. A wireless access network node in the E-UTRAN 108 is referred to as an evolved Node B (eNB) 112, which can include functionalities of a base station and of a base station controller. Although just one eNB 112 is depicted in FIG. 1, it is noted that the E-UTRAN 108 can include multiple eNBs. In some deployment scenarios, one or more Home eNBs (HeNB) and HeNB Gateways (not shown in FIG. 1) may be included in E-UTRAN 108.

In the ensuing discussion, although reference is made to eNBs, it is noted that techniques or mechanisms according to some implementations of the present disclosure can be used with other types of wireless or radio access network nodes.

The E-UTRAN also includes a Multi-cell/Multicast Coordination Entity (MCE) 114. An eNB 112 is served by a single MCE 114. Note that there can be multiple MCEs 114 in the E-UTRAN 108 in some examples. The MCE 114 performs admission control and allocation of radio resources used by an eNB 112 in a Multimedia Broadcast Single Frequency Network (MBSFN) area for multi-cell MBMS transmissions using MBSFN operation. The allocated radio resources, as allocated by the MCE 114, can be used to perform multicast transmissions of an MBMS service.

The multicast transmissions of an MBMS service can use an MBSFN mode of operation; such multicast transmissions can be referred to as MBSFN transmissions. An MBSFN transmission uses multiple cells (and their respective associated eNBs) to multicast the same bearer data to multiple UEs. An MBSFN transmission utilizes the MCH to multicast data, and scheduling information of MBSFN transmissions for on-going MBMS services are periodically provided to the UEs as MCH scheduling information. An MBSFN transmission can be used to multicast data in a relatively wide area.

In alternative implementations, a single cell point-to-multipoint (PTM) transmission can be employed to multicast bearer data of an MBMS service. Rather than using an MCH, a single cell PTM transmission uses a different physical channel, for example a Physical Downlink Shared Channel (PDSCH), for carrying the multicast bearer data. The single cell PTM transmission may utilize a group Radio Network Temporary Identifier (RNTI) to identify an MBMS service.

The mobile communications network 102 also includes a MBMS Gateway (MBMS-GW) 116, which is provided between an eNB 112 and a Broadcast/Multicast Service Center (BM-SC) 118. The MBMS-GW 116 sends data of a PTT group communication to one or more eNBs that are involved in the PTT group communication. In the case that multiple eNBs are involved in the PTT group communication, the MBMS-GW 116 broadcasts or multicasts the data to the multiple eNBs. In the present disclosure, each of the MBMS-GW 116 or eNB 112 can be referred to as a "network node."

The data that is sent from the MBMS-GW 116 to one or more eNBs 112 include MBMS packets, where each MBMS packet carries a portion of the data that is to be communicated in the PTT group communication. In some examples, the MBMS-GW 116 can use Internet Protocol (IP) multicast to forward MBMS packets to eNBs 112. The interface between the MBMS-GW 116 and an eNB 112 is a user plane interface (referred to as an M1 interface) for carrying bearer data.

The MBMS-GW 116 is also connected to a control node of the mobile communications network 102, where this control node is referred to as a mobility management entity (MME) 120. The MME 120 is a control node for performing various control tasks associated with the E-UTRAN 108. For example, the MME 120 can perform idle mode UE tracking and paging, bearer activation and deactivation, selection of a serving gateway) S1 handover of the UE between eNBs, authentication of a user, generation and allocation of a temporary identity to a UE, and so forth. In other examples, the MME 120 can perform other or alternative tasks.

The MBMS-GW 116 interacts with the MME 120 over a control plane interface (referred to as an Sm interface) to perform MBMS session control, including starting an MBMS session, updating an MBMS session, or stopping the MBMS session. The MME 120 is also connected over a control plane interface (referred to as an M3 interface) to the MCE 114 in the E-UTRAN 108. Control signaling is exchanged between the MBMS-GW 116 and the MCE 114 (through the MME 120) to perform the MBMS session control. Session control signaling can also be exchanged between the MCE 114 and the eNB 112.

FIG. 1 also shows another control plane interface (referred to as S1-MME) interface between the MME 120 and the eNB 112 to operate unicast bearer services.

The BM-SC 118 can initiate an MBMS session start procedure when the BM-SC 118 is ready to send data over an MBMS bearer. The MBMS session start procedure informs the MBMS-GW 116 of the imminent start of data transmission, and the BM-SC 118 provides MBMS session attributes to the MBMS-GW 116. In some cases, the BM-SC 118 can initiate an MBMS session start procedure with multiple MBMS-GWs.

In response to the MBMS session start procedure, the MBMS-GW 116 creates an MBMS bearer context, and stores the session attributes in the MBMS bearer context. An MBMS bearer context contains information that relates to a corresponding MBMS session and to the MBMS bearer used in the MBMS session. The BM-SC 118 can also initiate an MBMS session update procedure to update the service area for an on-going MBMS session.

In addition, an MBMS session update procedure can be initiated towards one or more MBMS-GWs 116, and can cause the MBMS session attributes in the MBMS bearer context to be modified. Further details regarding the MBMS session start procedure and the MBMS session update procedure are provided in 3GPP TS 36.300.

Note that various nodes depicted in FIG. 1 are logical entities, where at least some of the logical entities can be collocated within a common physical node. For example, an MCE 114 can be collocated with an eNB 112 in a physical node.

Although specific network nodes are shown in FIG. 1 for performing PTT group communications, it is noted that in other examples, some of the network nodes in FIG. 1 can be omitted or replaced with other network nodes. Also, the network nodes shown in FIG. 1 constitute a portion of the network nodes that form the mobile communications network 102, and other network nodes may be present.

The PTT server 106 is connected to the BM-SC 118 over a control plane interface (referred to as an MB2-C interface) and a user plane interface (referred to as an MB2-U interface). Collectively, the MB2-C and MB2-U interfaces are referred to as a MB2 interface. The MB2 interface provides the ability for an application in the PTT server 106 to use the MBMS functionality to deliver data to members of a PTT group. Procedures that can be performed over the MB2 interface include allocation of TMGIs, deallocation of TMGIs, allocation of a group RNTI, deallocation of a group RNTI, activation of an MBMS bearer, deactivation of an active MBMS bearer, modifying characteristics of an active MBMS bearer, and other tasks. Further details regarding the MB2 interface are provided in 3GPP TS 23.468, in some examples. The MB2-C interface is a control plane interface carrying control information or signaling, while the MB2-U interface is a user plane interface for carrying user data.

The interface between the BM-SC 118 and the MBMS-GW 116 includes a control plane interface (referred to as SGmb), and a user plane interface (referred to as SGimb). In some examples, the control plane interface (SGmb) between the BM-SC 118 and the MBMS-GW 116 can employ messaging according to a Diameter Protocol, as described in 3GPP TS 29.061. For example, a Diameter Re-Auth Request and Answer procedure can be used to start, update, and stop a MBMS session.

Figure 2A:
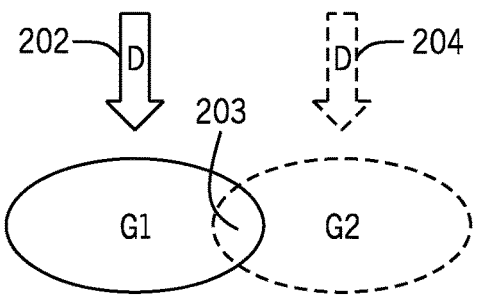
FIGS. 2A-2C illustrate examples of communicating data prior to and after regrouping of push-to-talk (PTT) groups, according to various implementations.
Figure 2B:
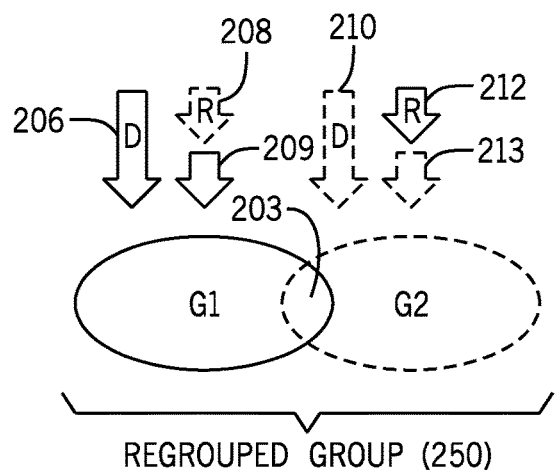
Figure 2C:
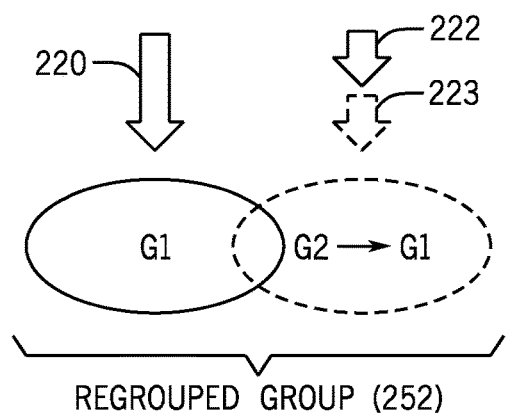

FIGS. 2A-2C illustrate examples of performing regrouping according to some implementations. FIG. 2A depicts PTT groups G1 and G2 prior to regrouping. Each PTT group G1 or G2 includes a number of UEs. In the example of FIG. 2A, the PTT groups G1 and G2 overlap in that they share at least one UE in an overlapping region 203. Arrow 202 represents the multicasting of downlink data to UEs in group G1, using a first MBMS bearer. Arrow 204 represents the multicasting of downlink data to group G2, using a second MBMS bearer.

FIG. 2B illustrates data communications after regrouping of the PTT groups G1 and G2 have been performed to form a regrouped PTT group 250, according to some implementations. The regrouping performed in FIG. 2B involves combining (or merging) groups G1 and G2, such that the groups become a merged group.

In the ensuing discussion, "G1 data" refers to downlink data of PTT group G1 (i.e. data transmitted by a UE in PTT group G1 for receipt by members of PTT group G1). "G2 data" refers to data of PTT group G2. After the regrouping, data can be transmitted by a UE in the regrouped group for multicast delivery to members of the regrouped group. For ease of explanation, after regrouping, G1 data can refer to data transmitted by a UE that was originally part of PTT group G1, and G2 data can refer to data transmitted by a UE that was originally part of PTT group G2.

As seen in FIG. 2B, after the regrouping, G1 data can be delivered by a PTT server directly to a first subset of members (UEs) of the regrouped group 250; this first subset of UEs includes UEs of original PTT group G1. The G1 data is multicast to the first subset of UEs using the first MBMS bearer (as indicated by arrow 206). Note that the first MBMS bearer is an existing MBMS bearer used prior to the regrouping performed in FIG. 2B. As used here, direct delivery of data to members of a PTT group can refer to a data delivery process in which the data is multicast to a first multicast address for delivery to the members of the PTT group without being re-directed to a different multicast address.

FIG. 2B also shows direct delivery of G2 data to a second subset of UEs of the regrouped group 250; the second subset of UEs includes UEs of original PTT group G2. The G2 data multicast to the second subset of UEs uses the second MBMS bearer (as indicated by arrow 210). Note that the second MBMS bearer is an existing MBMS bearer used prior to the regrouping performed in FIG. 2B.

In addition, re-directed G2 data (represented by arrow 208) is sent to the first subset of UEs of the regrouped group 250, using the first MBMS bearer (as indicated by arrow 209), and re-directed G1 data (represented by arrow 212) is sent to the second subset of UEs of the regrouped group 250, using the second MBMS bearer (as indicated by arrow 213). Re-directed data of a PTT group can refer to the data that has been re-directed from a first multicast address to a different multicast address.

According to FIG. 2B, after regrouping, re-directed G2 data (208) is delivered using the first MBMS bearer for original PTT group G1, and similarly, re-directed G1 data (210) is delivered using the second MBMS bearer for original PTT group G2. By using existing MBMS bearers (of respective existing MBMS services) for delivering data to UEs of the regrouped group 250, latency associated with having to form a new MBMS service (and an associated MBMS bearer) can be avoided.

An issue associated with the delivery of both direct data and re-directed data to UEs of the regrouped group 250 according to FIG. 2B is that duplication of data delivery can occur for UEs in the overlapping region 203 between groups G1 and G2. In accordance with some implementations (discussed further below), techniques or mechanisms are provided to avoid duplication of delivery of data to UEs in the overlapping region 203.

In FIG. 2B, it is noted that signaling is not provided to UEs of original PTT groups G1 and G2 to perform the regrouping to form regrouped group 250. In other words, although network nodes may be aware of the regrouping, the UEs are not signaled to change their memberships in original PTT groups G1 and G2. This is beneficial in reducing signaling overhead with the UEs of original PTT groups G1 and G2 in regroup and reverse operations.

FIG. 2C illustrates techniques or mechanisms for delivery of data after regrouping according to alternative implementations. In FIG. 2C, UEs in at least one of the original PTT groups are notified of the regrouping. More specifically, in the example of FIG. 2C, UEs in original PTT group G2 are notified to participate in original PTT group G1. Thus, the UEs of original PTT group G2 become members of original PTT group G1. After regrouping, the regrouped group (G1) is referenced as regrouped group 252.

As shown in FIG. 2C, after regrouping, data of the regrouped group 252 can be delivered to the UEs of the regrouped group 252 using the first MBMS bearer (as indicated by arrow 220) and the second MBMS bearer (as indicated by arrows 222, 223).

Figure 3:
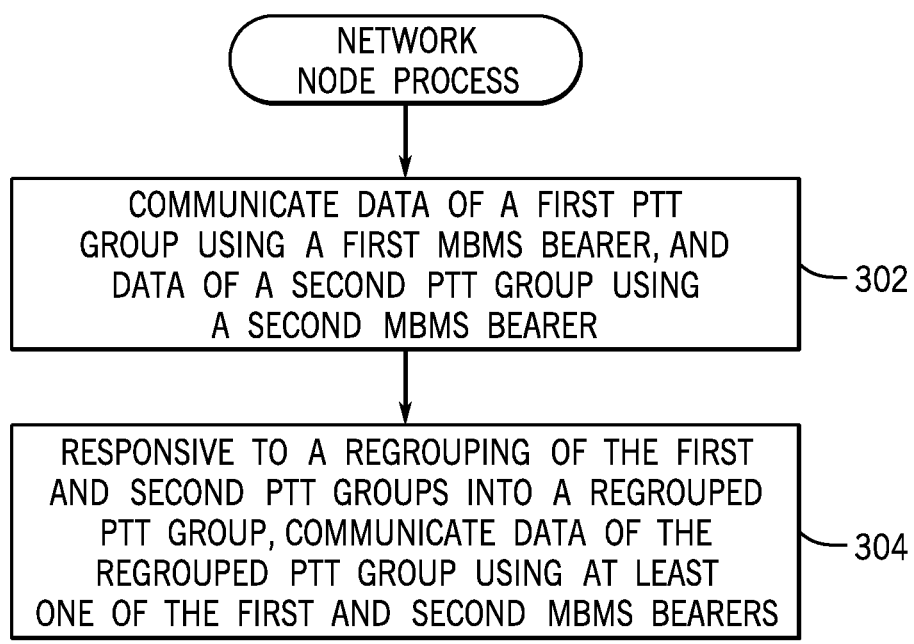
FIG. 3 is a flow diagram of a process performed by a network node, according to some implementations.

FIG. 3 is a flow diagram of a process performed by a network node according to some implementations. The network node can be either the MBMS-GW 116 or the eNB 112 of FIG. 1.

Prior to regrouping, the network node communicates (at 302) data of a first PTT group using a first MBMS bearer, and data of a second PTT group using a second MBMS bearer.

Upon a regrouping of the first and second PTT groups into a regrouped group, the network nodes respond and deliver data from the regrouped group as shown in FIGS. 2B and 2C, for example. In other words, responsive to a regrouping of the first and second PTT groups into a regrouped group, the network node communicates (at 304) data of the regrouped group using at least one of the first and second MBMS bearers, which are existing MBMS bearers prior to the regrouping.

If the network node is the MBMS-GW 116, then the communicating of data at 302 and 304 includes transmission of the data to one or multiple eNBs. If the network node is the eNB 112, then the communicating of data at 302 and 304 includes receipt of data from the MBMS-GW 116.

Regrouping Using a Master and Slave Solution

Figure 4:
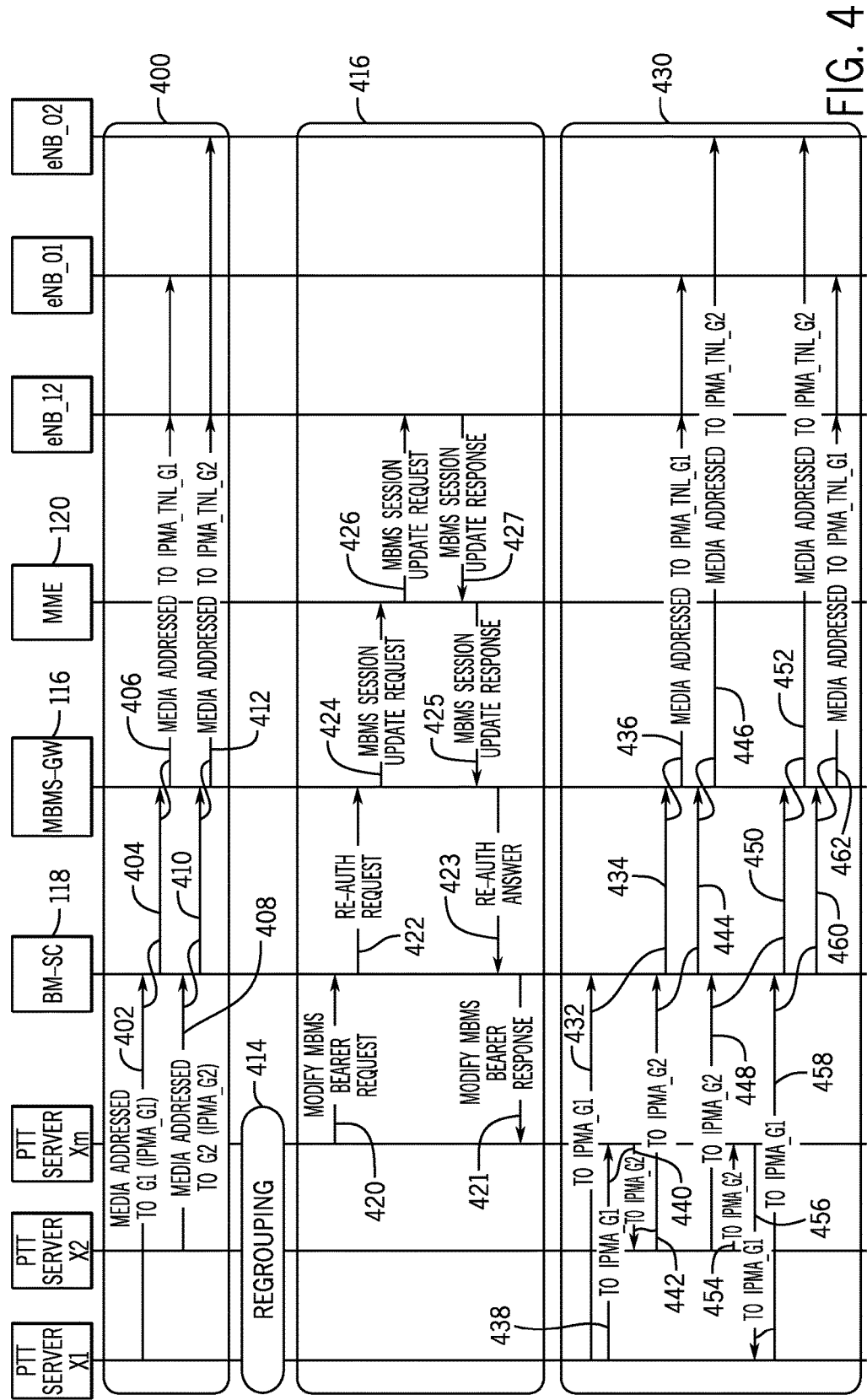
FIGS. 4 and 5 are message flow diagrams of information flow among various entities, according to various implementations.

FIG. 4 is a message flow diagram that depicts information flow before and after regrouping. After regrouping, the communication of data is performed according to the technique of FIG. 2B technique discussed above. The information flow of FIG. 2 occurs among the following entities: PTT server X1, PTT server X2, PTT server Xm, BM-SC 118, MBMS-GW 116, MME 120, eNB_12, eNB_01, eNB_02.

The PTT server Xm is a master PTT server. The solution for regrouping according to FIG. 4 can be referred to as a Master and Slave solution.

Prior to regrouping, there are two active PTT groups G1 and G2. The media for G1 and G2 are transmitted to the members of G1 and G2 utilizing the MBMS sessions for G1 and G2 in downlink. The PTT server X1 is used to deliver data to UEs of PTT group G1, and the PTT server X2 is used to deliver data to UEs of PTT group G2.

Process 400 involves communication of data prior to regrouping. In process 400, the media (bearer data) for G1 is addressed by the PTT server X1 to IP multicast address IPMA_G1 in IP multicast datagrams. The PTT server X1 sends (at 402) the IP multicast datagrams to the BM-SC 118. In the example of FIG. 4, the UEs belonging to G1 and receiving the MBMS session for G1 are located in cells served by eNB_12 and eNB_01. The IP multicast datagrams are encapsulated into further IP multicast packets, which are addressed to a multicast address IPMA_TNL_G1 by the BM-SC 118 or the MBMS-GW 116. In other words, an IP multicast datagram sent by the PTT server X1 (and addressed to IPMA_G1) is encapsulated into an IP multicast packet that is addressed to multicast address IPMA_TNL_G1.

The media for G1 received by the BM-SC 118 is sent (at 404) to the MBMS-GW 116, and this media is in turn sent (at 406) by the MBMS-GW 116 to respective eNBs eNB_12 and eNB_01 that are serving the multicast group associated with the IP multicast address IPMA_TNL_G1.

If MBSFN transmission is used, eNB_12 and eNB_01 can configure an MBMS session associated with TMGI_G1 to transmit the media to the UEs participating in G1 over the corresponding MCH. If single cell PTM transmission is used, eNB_12 and eNB_01 can configure an MBMS session associated with the group RNTI for G1 (RNTI_G1) to transmit the media to the UEs participating in G1 over the corresponding PDSCHs. RNTI_G1 may be set to a cell specific value or to a value common to multiple cells. The PTT server X1 may also transmit the media in unicast datagrams (by utilizing unicast bearers) to one or more UEs participating in G1.

In process 400, the media for G2 is addressed to IP multicast address IPMA_G2 in IP multicast datagrams. The PTT server X2 sends (at 408) the IP multicast datagrams to the BM-SC 118. The UEs belonging to G2 and receiving the MBMS session for G2 are located in the cells served by eNB_12 and eNB_02. The IP multicast datagrams are encapsulated into respective IP multicast packets, which are addressed to the multicast address IPMA_TNL_G2 by the BM-SC 118 or the MBMS GW 116.

The media for G2 received by the BM-SC 118 is sent (at 410) to the MBMS-GW 116, and this media is in turn sent (at 412) by the MBMS-GW 116 to respective eNBs eNB_12 and eNB_02 that are serving the multicast group associated with the IP multicast address IPMA_TNL_G2.

If MBSFN transmission is used, eNB_12 and eNB_02 can configure an MBMS session associated with TMGI_G2 to transmit the media to the UEs belonging to G2 over the corresponding MCH. If single cell PTM transmission is used, eNB_12 and eNB_02 can configure an MBMS session associated with the group RNTI for G2 (RNTI_G2) to transmit the media to the UEs participating in G2 over the corresponding PDSCHs. RNTI_G2 may be set to a common for multiple cells or cell specific value. The PTT server X2 may also transmit the media in unicast datagrams (utilizing unicast bearers) to one or more UEs participating in G2.

Process 414 includes regrouping of PTT groups G1 and G2 into a regrouped group. The regrouping can be performed by the master PTT server Xm. The regrouping of G1 and G2 is performed at the PTT server level, and as noted above, does not involve signalling of the regrouping to UEs in groups G1 and G2.

In response to the regrouping, process 416 and process 430 are performed. Process 416 includes performing modification of the MBMS sessions for the regrouping, where the modification ensures that delivery of duplicate data to UEs in the regrouped group is avoided. Process 416 is discussed further below.

Process 430 communicates data to UEs of the regrouped group. The PTT server X1 starts forwarding (at 438) the media to the master PTT server Xm in addition to transmitting (at 432) the media directly to G1. The media transmitted by the PTT server X1 directly to G1 (using IP multicast addresses IPMA_G1 and IPMATNL_G1) follows path 432, 434, and 436 (similar to paths 402, 404, and 406 prior to regrouping). Note that the data sent at 436 to eNB_12 and eNB_01 uses the existing MBMS bearer for original PTT group G1.

The master PTT server Xm redirects (at 440) the media received from the PTT server X1 (at 438) to the PTT server X2. The media received from the PTT server X1 (at 438) by the master PTT server Xm is addressed to IPMA_G1. The redirected media to PTT server X2 is addressed to IPMAG2.

The PTT server X2 in turn sends (at 442) the redirected media to the BM-SC 118, and the redirected media in turn follows paths 444 and 446 to eNB_02 (this redirected media is encapsulated into IP multicast packets sent to IPMA_TNL_G2).

If MBSFN transmission is used, the media directly transmitted (at 432) by PTT server X1 is delivered using the MBMS session associated with TMGI_G1 over the corresponding MCH, and the media redirected (at 440) by the master PTT server Xm to the PTT server X2 is delivered using the MBMS session associated with TMGI_G2 over the corresponding MCH.

If a single cell PTM transmission is used, the media directly transmitted (at 432) by PTT server X1 is delivered using the MBMS session associated with RNTI_G1 over the corresponding PDSCHs, and the media redirected (at 440) by the master PTT server Xm to the PTT server X2 is delivered using the MBMS session associated with RNTI_G2 over the corresponding PDSCHs.

In either case, no MCCH modification or signalling to individual UE is performed.

In process 430, the PTT server X2 also starts forwarding (at 454) media to the master PTT server Xm in addition to transmitting (at 448) the media directly to G2. The media transmitted by the PTT server X2 directly to G2 (using IP multicast addresses IPMA_G2 and IPMA_TNL_G2) follows path 448, 450, and 452 (similar to paths 408, 410, and 412 prior to regrouping). Note that the data sent at 452 to eNB_02 uses the existing MBMS bearer for original PTT group G2.

The master PTT server Xm redirects (at 456) the media received from the PTT server X2 (at 454) to the PTT server X1. The media received from the PTT server X2 (at 454) by the master PTT server Xm is addressed to IPMA_G2. The redirected media to PTT server X1 is addressed to IPMAG1.

The PTT server X1 in turn sends (at 458) the redirected media to the BM-SC 118, and the redirected media in turn follows paths 460 and 462 to eNB_12 and eNB_01 (this redirected media is encapsulated into IP multicast packets sent to IPMA_TNL_G1).

If MBSFN transmission is used, the media directly transmitted (at 448) by the PTT server X2 is delivered using the MBMS session associated with TMGI_G2 over the corresponding MCH, and the media redirected (at 456) by the master PTT server Xm to the PTT server X1 is delivered using the MBMS session associated with TMGI_G1 over the corresponding MCH.

If single cell PTM transmission is used, the media directly transmitted (at 448) by the PTT server X2 is delivered using the MBMS session associated with RNTI_G2 over the corresponding PDSCHs, and the media redirected (at 456) by the master PTT server Xm to the PTT server X1 is delivered using the MBMS session associated with RNTI_G1 over the corresponding PDSCHs.

In either case, no MCCH modification or signalling to individual UE is performed.

As noted above, by using a master and slave approach according to FIG. 4, individual signalling to UEs of G1 and/or G2 can be avoided, and member information of G1 and G2 does not have to be exchanged between the PTT servers X1 and X2 for the purpose of regrouping G1 and G2, which results in reduced signalling overhead associated with regrouping.

Process 416 performs MBMS session modification which corresponds to the application layer modification (regrouping) of process 414. Process 416 includes the master PTT server Xm sending (at 420) a request, to the BM-SC 118, to update the MBMS service or MBMS session for G2. The request sent at 420 can be a Modify MBMS Bearer Request in some implementations.

In response to the Modify MBMS Bearer Request, the BM-SC 118 sends (at 422) a Diameter Re-Auth Request to the MGMS-GW 116, which in turn sends (at 424) an MBMS Session Update Request to the MME 120. The MME 120 forwards (at 426) the MBMS Session Update to eNB_12.

As a result, the cells under control of eNB_12 (which originally multicasted media for both G1 and G2 prior to the regrouping) are removed from the G2 service area, so that eNB_12 is not used for multicasting G2 data anymore. This is performed to avoid duplicated delivery of the same media in the overlapping region 103 (FIG. 2B) to UEs of original PTT groups G1 and G2. In other examples, a similar process can be performed to remove eNB_12 from the G1 service area.

In the process 416, an MBMS Session Update Response is sent (at 427) to the MME 120 in response to the MBMS Session Update Request sent at 426. An MBMS Session Update Response is sent (at 425) by the MME 120 to the MBMS-GW 116 in response to the MBMS Session Update Request sent at 424. A Re-Auth Answer is sent (at 423) from the MBMS-GW 116 to the BM-SC 118 in response to the Re-Auth Request sent at 422. A Modify MBMS Bearer Response is sent (at 421) by the BM-SC 118 to the master PTT server Xm in response to the Modify MBMS Bearer Request sent at 420.

Although specific messages are shown as part of the process 416 of FIG. 4, it is noted that in other examples, other types of messages can be employed for MBMS service or MBMS session modification.

In the request sent at 420, the master PTT server Xm can request one or more BM-SCs to modify an MBMS bearer to perform a service area update as noted above. Such modification of an MBMS bearer can be according to 3GPP TS 23.468. In the request sent at 422, the BM-SC 118 can request one or more MBMS-GWs to update the service area of the MBMS service or the MBMS session used for G2 by performing a Re-Auth procedure (using a Re-Auth Request/Answer command) according to 3GPP TS 29.061. In the request sent at 424, the MBMS-GW 116 can request one or more MMEs to update the service area of the MBMS service or the MBMS session used for G2 by sending and receiving an MBMS Session Update Request and Response, respectively, according to 3GPP TS 29.274. In the request sent at 426, the MME 120 can request one or more MCEs or eNBs to update the service area of the MBMS service or the MBMS session used for G2 by sending and receiving an MBMS Session Update Request and Response, respectively, according to 3GPP TS 36.444 or 36.443.

An eNB (e.g. eNB_12) processes the MBMS Session Update Request (sent at 426) and ceases delivering the media for G2 to the cells that are receiving the media for both G1 and G2, which causes cessation of delivery of data of MBMS bearer used for G2 in the cells. The eNB also stops receiving IP packets addressed to IPMA_TNL_G2 if none of the cells under its control participate in the service area for G2 any longer.

Note that other attributes of the MBMS service or MBMS session may also be reconfigured. For example, the QoS profile of each MBMS service or MBMS session may be changed to meet the requested QoS of media for G1 and G2. If the QoS for G1 is higher than G2, the QoS profile for G2 may be upgraded to be equivalent to the QoS profile for G1. If the QoS for G1 is lower than G2, the QoS profile for G1 may be upgraded to be equivalent to the QoS profile for G2.

The control plane messages (420-427) mentioned above may include a new information element to indicate that the MBMS session information over MCCH is to be maintained; in other words, the MCCH is not to be modified. This new information element is discussed further below.

Since the process 430 involves both directly sent media and re-directed media for receipt by UEs in the regrouped group, synchronization is performed to synchronize the delivery of directly sent media and re-directed media. In some examples, the synchronization can employ a SYNC protocol to synchronize the delivery of media directly transmitted by the PTT server X1 or X2 and the media redirected to the other PTT server X2 or X1, respectively, via the master PTT server Xm. A SYNC protocol layer can be included in the BM-SC 118 and an eNB to implement the SYNC protocol. The SYNC protocol is described in 3GPP TS 25.446.

The interface between a PTT server and the BM-SC 118 may be extended to include an indication that both the directly transmitted and the redirected media belong to a same MBMS service or session (serving a regrouped group) (applicable to MBSFN transmission and single cell PTM transmission). The BM-SC 118 may calculate and configure a timestamp value for SYNC protocol data units (PDUs) so that the directly transmitted and the redirected media can be transmitted by the eNBs in a synchronized manner. For example, when the regrouping is active, the BM-SC 118 becomes aware of a PDU redirected via the master PTT server Xm and a PDU forwarded directly by the PTT server X1 or X2. Both direct and redirected PDUs should have the same packet number or the same timestamp value. The BM-SC 118 can calculate the timestamp value for both PDUs which can be utilized in the SYNC protocol.

Messaging Enhancement for the Master and Slave Approach

As explained above, information elements may be added to an existing command or message between a PTT server and the BM-SC 118, between the BM-SC 118 and the MBMS-GW 116, between the MBMS-GW 116 and the MME 120, and between the MME 120 and an MCE or an eNB.

For example, an MBMS Session Update Request sent between the MME 120 and an MCE or eNB over the M3 interface (FIG. 1) may be extended as shown below. In some examples, proposed changes to Sections 9.1.11 and 9.2.2.x of 3GPP TS 36.444 are highlighted with underlines. MBMS SESSION UPDATE REQUEST (Section 9.1.11 of 3GPP TS 36.444).

This MBMS Session Update Request (including information elements set forth in the table below) is sent by the MME 120 to inform an MCE of the changed characteristics of an ongoing MBMS service session.

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME MBMS M3AP ID | M | | 9.2.3.2 | | YES | reject |
| MCE MBMS M3AP ID | M | | 9.2.3.1 | | YES | reject |
| TMGI | M | | 9.2.3.3 | | YES | reject |
| MBMS Session Identity | O | | 9.2.3.4 | | YES | ignore |
| MBMS E-RAB QoS parameters | M | | 9.2.1.3 | | YES | reject |
| MBMS Session Duration | M | | 9.2.3.5 | | YES | reject |
| MBMS Service Area | O | | 9.2.3.6 | | YES | ignore |
| Minimum Time to MBMS Data Transfer | M | | 9.2.3.8 | | YES | reject |
| TNL Information | O | | | | YES | ignore |
| >IP Multicast Address | M | | 9.2.2.1 | | — | |
| >IP Source Address | M | | IP Address 9.2.2.1 | | — | |
| >GTP DL TEID | M | | GTP TEID 9.2.2.2 | | — | |
| Time of MBMS Data Transfer | O | | 9.2.3.9 | | YES | ignore |
| <u>MBMS session information change</u> | <u>O</u> | | <u>9.2.2.x</u> | | — | <u>ignore</u> |

The new information element (IE) (set forth below) according to some implementations of the present disclosure that is added to the MBMS Session Update Request is an MBMS session information change IE. The MBMS session information change IE indicates whether the eNB should maintain the MBMS session information over MCCH. If the MBMS session information change IE is set to a first value (e.g. "Yes" value), then the MBMS session information is changed. However, if the MBMS session information change IE is set to a second, different value (e.g. "No" value), then the MBMS session information is not changed.

| IE/Group Name | Presence | Range | IE type and reference | Semantics description |
|---|---|---|---|---|
| MBMS session information change | O | | Enumerated (Yes, No) | indicates whether the eNB should maintain the MBMS session information over MCCH |

Regrouping Using Replacement Solution

In alternative implementations of the present disclosure, rather than using a master and slave approach as discussed above (which involves a master PTT server), a regrouping using replacement solution can be employed, in which at least one of the original PTT groups is replaced with another original PTT group (such as shown in FIG. 2C above, where original PTT group G2 is informed to participate in PTT group G1). In this example, PTT group G1 replaces PTT group G2 (the regrouped group after regrouping becomes PTT group G1).

Figure 5:
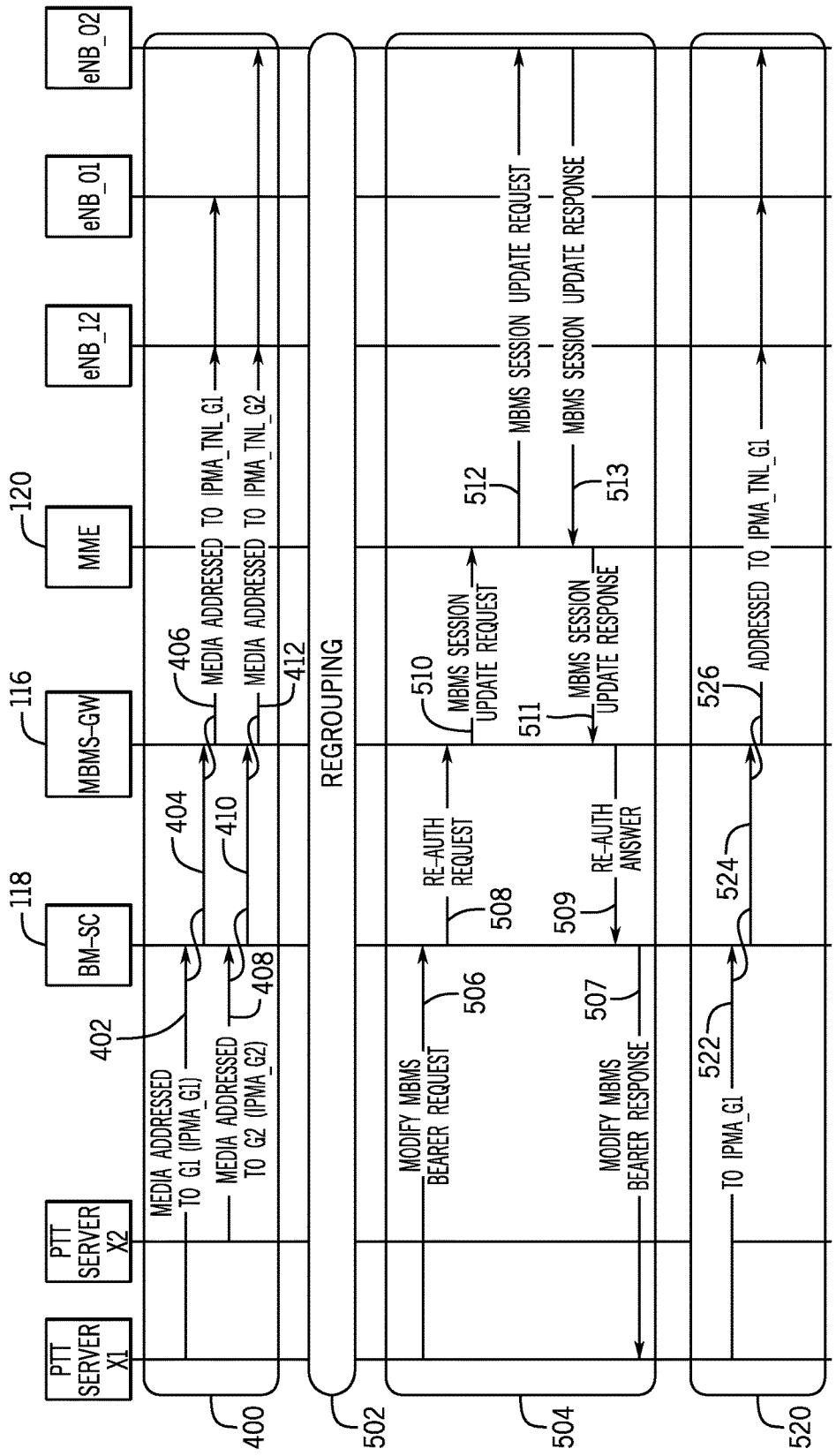

FIG. 5 is a message flow diagram of an information flow for a regrouping technique according to the regrouping using replacement solution. In the flow diagram of FIG. 5, note that a master PTT server (PTT server Xm in FIG. 4) is not involved.

Process 400 in FIG. 5 is the same as process 400 in FIG. 4.

Process 502 performs regrouping of original PTT groups G1 and G2, in which members of PTT group G2 are notified to participate in PTT group G1. In process 502, the PTT server X1 can send a new message, a new command, or a new indication in an existing message or command to the UEs in G2 to participate in G1. The messaging (message(s) or command(s)) sent by the PTT server X1 to the UEs in G2 can include point-to-point messaging or point-to-multipoint messaging. In some examples, the messaging can include Session Information Protocol (SIP) messaging, or messaging according to another protocol. If there are a large number of UEs in a PTT group, multicast delivery of the messaging can be more efficient and can reduce signalling overhead and latency.

The UEs in G2 can receive the messaging over the MBMS session for G2, and in response to such messaging, the UEs in G2 can join G1. The messaging sent to the UEs in G2 may be addressed to IPMA_TNL_G2 by the BM-SC 118 or the MBMS-GW 116. The eNBs can forward the messaging, over MCCH or MTCH, in a new Radio Resource Control (RRC) message (discussed further below) or in an existing message containing a new information element. The message or the command can be encrypted by a PTT server using a key for media security configured for G2.

In response to the message or the command received by the UEs, the UEs can decrypt and forward the decrypted message or command to an upper layer of each UE, where the upper layer can include a PTT application that performs PTT communications. The PTT application can reconfigure group information stored in a UE, such as to change the group information to indicate G2 instead of G1 in the discussed examples. In some examples, the UE can acknowledge the receipt of the message or command back to the PTT server. In other examples, the UE does not perform the acknowledgment. The UE can then start utilizing the existing MBMS bearer service for G2 to receive media for G1.

Process 504 performs modification of an existing MBMS service or MBMS session for G2 in various network nodes of the core network and the radio access network. The modification enables delivery of media for the regrouped G1 to the UEs which have joined G1 from G2. In particular, eNBs not initially delivering service to G1 members (e.g. eNB_02 in the considered example) do so in order to allow previous G2 members to receive G1 (combined or regrouped) group service in the corresponding area once they have joined G1. Process 504 may also include service area modification as discussed in Process 416 to avoid duplicated delivery.

The process 504 for modifying the existing MBMS service or MBMS session includes the PTT server X1 sending (at 506) a request, to the BM-SC 118, to update the MBMS service or MBMS session for G2. The request sent at 506 can be a Modify MBMS Bearer Request in some implementations.

In response to the Modify MBMS Bearer Request, the BM-SC 118 sends (at 508) a Diameter Re-Auth Request to the MGMS-GW 116, which in turn sends (at 510) an MBMS Session Update Request to the MME 120. The MME 120 forwards (at 512) the MBMS Session Update to eNB_02 in case MCE is collocated within the eNB_02. If MCE is not collocated, the MME 120 forwards the MBMS Session Update to MCE which in turn forwards the message to eNB_02.

In the request sent at 506, the PTT server X1 requests one or more BM-SCs to modify the MBMS service or the MBMS session used for G2 and to utilize it for delivery of media for G1. In the request sent at 508, the BM-SC 118 requests one or more MBMS-GWs to update the MBMS service or the MBMS session for G2 and reconfigure the MBMS service or the MBMS session for delivering media for G1. This can be accomplished using an enhanced Diameter Re-Auth Request/Answer command procedure, for example.

In the request sent at 510, the MBMS-GW 116 requests one or more MMEs to update and reconfigure the MBMS service or the MBMS session for G2 to be utilized for G1 media delivery, such as by sending and receiving MBMS Session Update Request and Response, respectively. In some examples, the MBMS Session Update Request can be extended to include the an MBMS IP Multicast Distribution IE, which can be set to indicate the MBMS session for G1, for example (discussed in further example). For example, a Common Tunnel Endpoint Identifier (TEID) is set to the value associated with the MBMS service for G1, and an IP Multicast Distribution Address is set to the value associated with the MBMS service for G1. If other IEs of the MBMS Session Update Request are to be changed, they will be set accordingly to match the attributes associated with the MBMS service for G1. Such other IEs can include an IE relating to a QoS profile, for example. The QoS profile may be adjusted to the MBMS service for G1.

In the request sent at 512, the MME 120 can request one or more MCEs or eNBs to update the MBMS session for G2 to be used for G1 media delivery by sending and receiving an MBMS Session Update Request and Response, respectively. For example, the TMGI IE can be set to the value of TMGI_G2 and the TNL information IE is set to the values associated with the MBMS service for G1 (IP Multicast Address IE is set to IPMA_TNL_G1 and GTP DL TEID IE is set to the value associated with G1). An eNB (e.g. eNB_02) can process the MBMS Session Update Request, can join the multicast group associated with IPMA_TNL_G1, and can start using the existing MBMS bearer originally for G2 to deliver media for G1.

After the process 504 is performed, process 520 is started to send media to UEs of the regrouped group (G1). In the example of FIG. 5, media addressed to the combined G1 group will be received by the three eNBs (eNB_12, eNB_01, eNB_02). Media sent (at 522) by the PTT server X1 to IPMA_G1 is received by the BM-SC 118. This media then follows paths 524 and 526, with the media encapsulated into IP multicast packets sent to IPMA_TNL_G1.

If MBSFN transmission is used, the media for the regrouped group G1 is delivered using the MBMS session associated with TMGI_G1 using eNB_12 and eNB_01 over the corresponding MCH, and the updated MBMS session associated with TGMI_G2 using eNB_02 over the corresponding MCH.

If single cell PTM transmission is used, the media for the regrouped group G1 is delivered using the MBMS session associated with RNTI_G1 using eNB_12 and eNB_01 over the corresponding PDSCHs, and the updated MBMS session associated with RNTI_G2 using eNB_02 over the corresponding PDSCHs. RNTI_G1 and RNTI_G2 may be set to a common value to multiple cells or cell specific value.

Figure 6:
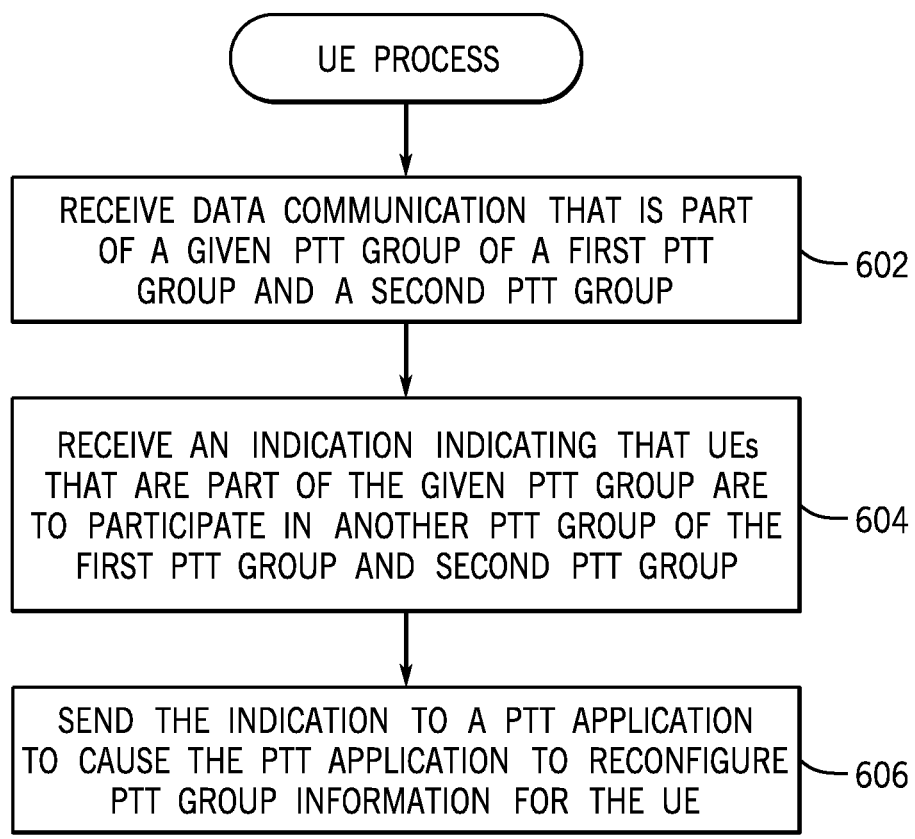
FIG. 6 is a flow diagram of a process performed by a user equipment (UE) according to some implementations.

FIG. 6 is a flow diagram of a process performed by a UE according to some examples. Prior to regrouping of PTT groups, the UE receives (at 602) data communication that is part of a given PTT group, where the given PTT group can be a first PTT group or a second PTT group.

The UE receives (at 604) an indication indicating that UEs that are part of the given PTT group are to participate in another PTT group (which is one of the first and second PTT groups). This received indication can be the messaging sent by a PTT server in process 502 of FIG. 5.

In response to the indication, the UE sends (at 606) the indication to a PTT application in the UE to cause the PTT application to reconfigure the PTT group information for the UE.

Messaging Enhancement for the Replacement Solution MCCH-Message

A new RRC message may be defined over MCCH to deliver upper layer messages to one or more UEs. This new message can be part of the MCCH-Message class provided by 3GPP TS 36.331.

The MCCH-Message class is the set of RRC messages that may be sent from the E-UTRAN to the UE on the MCCH logical channel. Proposed changes to the MCCH-Message class as set forth by 3GPP TS 36.331 are highlighted below with underlines.

```
-- ASN1START
MCCH-Message ::= SEQUENCE {
    message              MCCH-MessageType
}
MCCH-MessageType ::= CHOICE {
c1                       CHOICE {
mbsfnAreaConfiguration-r9    MBSFNAreaConfiguration-r9
},
    later                CHOICE {
        c2                       CHOICE{
            mbmsCountingRequest-r10    MBMSCountingRequest-r10
        },
        Later                CHOICE {
            c3                       CHOICE {
                mbmsDirectTransfer-r13    MBMSDirectTransfer-r13
            },
        messageClassExtension    SEQUENCE { }
        }
    }
}
-- ASN1STOP
```

In the above example, the new RRC message of the MCCH-Message class is an MBMSDirectTransfer message.

Details of the MBMSDirectTransfer message according to some examples are set forth below:

The MBMSDirectTransfer message carries upper layer signalling message over the MCCH logical channel.
Signalling radio bearer: N/A
RLC-SAP: UM
Logical channel: MCCH
Direction: E-UTRAN to UE
MBMSDirectTransfer message

```
-- ASN1START
MBMSDirectTransfer-r13::=    SEQUENCE {
    tmgi-r13                    TMGI-r9,
    group-RNTI                  C-RNTI              OPTIONAL,
    upperLayerInformation-r13   OCTETSTRING (512),
    nonCriticalExtension        SEQUENCE {}         OPTIONAL
}
-- ASN1STOP
```

MBMSDirectTransfer Field Descriptions

TMGI
indicates the MBMS bearer service or MBMS session which is to receive the upperLayerInformation.
Group-RNTI
indicates the MBMS bearer service or MBMS session which is to receive the upperLayerInformation in case of single cell PTM transmission.
upperLayerinformation
contains upper layer signalling information intended for the MBMS bearer service or MBMS session indicated by TMGI. The information may be encrypted and integrity protected by the media security for group communication or MCPTT Alternatively, the MBMSDirectTransfer message may be defined by another protocol and may be carried over a specific Multicast Traffic Channel (MTCH). The message may be forwarded to upper layers upon reception by a UE over MTCH.

Switching Bearer Indication in Re-Auth Request Command

As noted above in connection with FIG. 5, a Re-Auth Request (RAR) command for an MBMS session update request that is sent (at 508) includes an additional information element. This additional IE indicates TMGI of the other MBMS service for which the MBMS service indicted by the existing TMGI parameter is reconfigured.

The RAR command, defined in IETF Request for Comments (RFC) 6733, entitled "Diameter Base Protocol," dated October 2012, is indicated by a Command-Code set to 258 and the message flag 'R' bit set.

Various attribute-value pairs (AVPs) that are used for the SGmb interface (FIG. 1) between the BM-SC 118 and the MBMS-GW 116 are listed below. Other AVPs are not listed.

The bold AVPs in the message format indicate new optional AVPs for SGmb, or modified existing AVPs. The proposed changes to 3GPP TS 29.061 are highlighted below with underlines.

```
Message Format:
    <RAR> ::= < Diameter Header: 258, REQ, PXY >
              < Session-Id >
              { Origin-Host }
              { Origin-Realm }
              { Destination-Realm }
```

-continued

```
    { Destination-Host }
    { Auth-Application-Id }
    { Re-Auth-Request-Type }
    [ Called-Station-Id ]
    [ Framed-IP-Address]
    [ Framed-Ipv6-Prefix ]
    [ Framed-Interface-Id ]
    [ MBMS-Access-Indicator ]
    [ MBMS-StartStop-Indication ]
    [ MBMS-Service-Area ]
    [ QoS-Information ]
    [ MBMS-Session-Duration ]
    [ MBMS-Session-Identity ]
    [ MBMS-Session-Repetition-number ]
    [ TMGI ]
    [ Group RNTI ]
  * [ 3GPP-SGSN-Address ]
  * [ 3GPP-SGSN-Ipv6-Address ]
    [ MBMS-Time-To-Data-Transfer ]
    [ MBMS-Data-Transfer-Start ]
    [ MBMS-Data-Transfer-Stop ]
    [ MBMS-Flags ]
    [ MBMS-User-Data-Mode-Indication ]
    [ MBMS-BMSC-SSM-IP-Address ]
    [ MBMS-BMSC-SSM-Ipv6-Address ]
    [ MBMS-Flow-Identifier ]
    [ CN-IP-Multicast-Distribution ]
    [ MBMS-HC-Indicator ]
    [ MBMS-GW-UDP-Port-Indicator]  ; for IP unicast
encapsulated user data
    [ MBMS-GW-SSM-IP-Address ]    ; for IP multicast
encapsulated user data
    [ MBMS-GW-SSM-Ipv6-Address ]; for IP multicast
encapsulated user data
    [ MBMS-BMSC-SSM-UDP-Port ]    ; for IP multicast
encapsulated user data
    [ MBMS-2nd-TMGI ]              ; TMGI of the second
MBMS service
    [ MBMS-2nd-Group-RNTI ]        ; Group RNTI
for the second MBMS service
    [ Origin-State-Id ]
  * [ Proxy-Info ]
  * [ Route-Record ]
  * [ Supported-Features ]
    [ Restart-Counter ]
...
```

For the MBMS Session Update procedure, RAR is sent by the BM-SC in order for the MBMS-GW(s) to update their session attributes. The updated MBMS service area in the MBMS-Service-Area AVP and/or the updated Access indicator in the MBMS-Access-Indicator AVP are included. For E-UTRAN access, the RAR message may also contain the MBMS-Data-Transfer-Start AVP containing the absolute timestamp of the data delivery start. For distributed MCE architectures, i.e. when the MCE is part of eNB as described in clause 15.1.1 in TS 36.300, the MBMS-Data-Transfer-Start AVP should be used in MBSFN operation mode to ensure synchronized session control and to facilitate a graceful reallocation of resources for the MBSFN when appropriate. The MBMS-StartStop-Indication AVP with the value UPDATE is included. The MBMS-Time-To-Data-Transfer with AVP the value set to 0 is included. The MBMS-Session-Duration AVP is included to indicate the duration of the remaining part of the MBMS session. The 3GPP-SGSN-Address AVP and the 3GPP-SGSN-Ipv6-Address AVP are included if the related lists of MBMS control plane nodes (MMEs, SGSNs) in the MBMS-GW(s) have changed. TMGI contained in the TMGI AVP may be reconfigured to be associated with the other existing MBMS bearer service identified by the TMGI in MBMS-2nd-TMGI. TMGI contained in TMGI AVP or Group RNTI contained in the Group RNTI AVP may be reconfigured to be associated with the other existing MBMS bearer service identified by the TMGI in MBMS-2nd-TMGI or by the Group RNTI contained in MBMS 2nd Group RNTI. The other bold marked AVPs are included as given by the previous, corresponding MBMS Session Start procedure.

Upon reception of MBMS session update request including the MBMS-2nd-TMGI AVP or the MBMS-2nd-Group-RNTI AVP in the RAR command, the MBMS-GW identifies the IP multicast distribution information for the MBMS service or the MBMS session identified by the MBMS-2nd-TMGI AVP or the MBMS-2nd-Group-RNTI AVP. The information includes the Common Tunnel Endpoint Identifier, IP Multicast Distribution Address, IP Multicast Source Address and MBMS HC Indicator associated with the MBMS bearer service or the MBMS session identified by the MBMS-2nd-TMGI AVP. The MBMS-GW transmits the MBMS session update request including the IP multicast distribution information IE to the MMEs so that the MME can instruct the relevant eNBs to use the existing multicast service or the MBMS session identified by the TMGI or the Group RNTI for the other MBMS bearer service or the MBMS session identified by the MBMS 2nd TMGI or the MBMS 2nd Group RNTI. The IP multicast distribution information IE can be added in the MBMS Session Update Request. The proposed changes to 3GPP TS 29.274 are shown below with underlined text.

MBMS Session Update Request

The MBMS Session Update Request message is sent on the Sm/Sn interface by the MBMS-GW to the MME/SGSN as specified in 3GPP TS 23.246 and 3GPP TS 23.007.

Table 7.13.3-1 specifies the presence of the IEs in the message.

TABLE 7.13.3-1

Information Elements in a MBMS Session Update Request

| Information elements | Condition/Comment | | IE Type | Ins. |
|---|---|---|---|---|
| MBMS Service Area | C | This IE shall be forwarded to MME/SGSN if it is provided by the BM-SC. | MBMS Service Area | 0 |
| Temporary Mobile Group Identity (TMGI) | M | | TMGI | 0 |
| Sender F-TEID for Control Plane | O | | F-TEID | 0 |
| MBMS Session Duration | M | | MBMS Session Duration | 0 |
| QoS profile | M | See NOTE 1. | Bearer QoS | 0 |
| MBMS Session Identifier | C | This IE shall be forwarded to MME/SGSN if it is provided by the BM-SC. | MBMS Session Identifier | 0 |
| MBMS Flow Identifier | C | This IE shall be forwarded to MME/SGSN if it is provided by the BM-SC. | MBMS Flow Identifier | 0 |
| MBMS Time to Data Transfer | C O | This IE shall be forwarded to MME/SGSN if it is provided by the BM-SC. | MBMS Time to Data Transfer | 0 |
| MBMS Data Transfer Start | C O | This IE shall be forwarded to the MME if it is received from the BM-SC. | Absolute Time of MBMS Data Transfer | 0 |
| MBMS IP Multicast Distribution | O | This IE shall be forwarded to MME. | MBMS IP Multicast Distribution | 0 |
| Private Extension | O | | Private Extension | VS |

NOTE 1:
The uplink GBR and uplink MBR are ignored by MME/SGSN as specified in Section 20.5 of 3GPP TS 29.061.

Control Information Delivery for Single Cell PTM Transmission

As noted above, techniques or mechanisms according to some implementations can use either MBSFN transmissions or single cell PTM transmissions.

A new message may be defined to configure single cell PTM transmission within a cell or to deliver information to the upper layers of UEs participating in the single cell PTM transmission. The new message may include a group RNTI used for an MBMS session. The new message may be transmitted to a specific group RNTI. The group RNTI may be defined for all the UEs participating in single cell PTM transmissions or a specific MBMS session utilizing single cell PTM transmissions.

The new message delivers configuration information of a single cell PTM transmission or for the upper layers. An example of this new message is depicted below. The new message may be sent to a pre-configured group RNTI, SCPTM_RNTI, or a group RNTI assigned for a specific group over a single cell PTM channel.

An example of the new message is a SingleCellPTMConfiguration depicted below. To provide notification of a new group RNTI for a regrouped group, the group-RNTI-r13 IE of the SingleCellPTMConfiguration message below is set to a new group RNTI and the tmgi-r13 IE is set to the TMGI before regrouping.

The SingleCellPTMConfiguration message is carried over the MCCH logical channel.

Signalling radio bearer: a new SRB for multicasting control information or multicast data bearer
   RLC-SAP: UM
   Logical channel: MCCH or a new multicast control or traffic channel for single cell PTM transmission
   Direction: E-UTRAN to UE SincleCellPTMConfiguration Message

```
-- ASN1START
SingleCellPTMConfiguration-r13 ::=    SEQUENCE {
    MBMS-SessionInfoList-r13 :: =     SEQUENCE (SIZE (0..N)) OF MBMS-SessionInfo-r13
    pdsch-config-R13                  PDSCH-config-R13 OPTIONAL,
    upperLayerInformation-r13         OCTET STRING (512) OPTIONAL
}
MBMS-SessionInfo-r13 ::=              SEQUENCE {
    tmgi-r13                          TMGI-r9,
    group-RNTI-r13                       C-RNTI       OPTIONAL,
    sessionId-r13                        SessionId-r9 OPTIONAL,    -- Need
OR
    logicalChannelIdentity-r13           logicalChannelIdentity-r13,
    ...
}
-- ASN1STOP
```

MBMSDirectTransfer Field Description

MBMS-SessionInfoList
Includes a list of MBMS sessions using single cell PTM transmission.
pdsch-confiq
Includes PDSCH configuration information for receiving SingleCellPTMConfiguration message.
group-RNTI
indicates the group RNTI which is associated with TMGI.

System Architecture

Figure 7A:
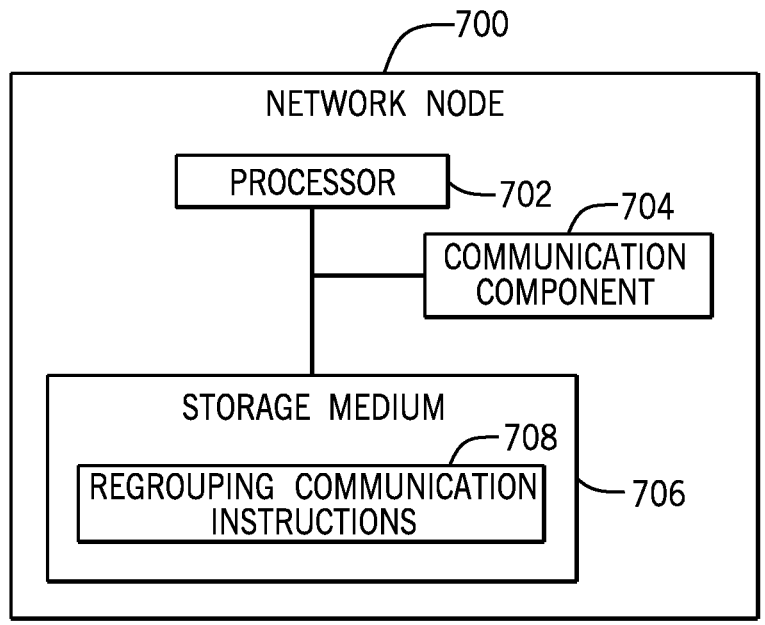
FIG. 7A is a block diagram of an example network node according to some implementations.

FIG. 7A is a block diagram of an example network node 700 according to some implementations. The network node 700 can be an MBMS-GW or an eNB. The network node 700 includes a processor (or multiple processors) 702, which can be coupled to a communication component (or multiple communication components) 704 (for performing wired and/or wireless communications). A processor can include a microprocessor, a microcontroller, a physical processor module or subsystem, a programmable integrated circuit, a programmable gate array, or another physical control or computing device.

The processor(s) 702 can also be coupled to a non-transitory machine-readable or computer-readable storage medium 706, which can store regrouping communication instructions 708 executable by the processor(s) 702 to perform various tasks as discussed above.

Figure 7B:
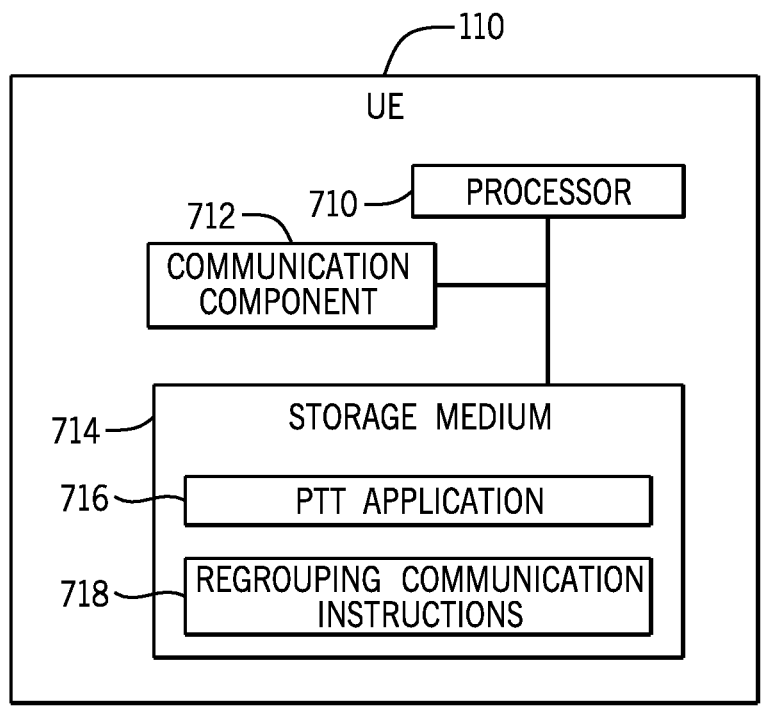
FIG. 7B is a block diagram of an example UE according to some implementations.

FIG. 7B is a block diagram of an example UE 110 according to some implementations. The UE 110 includes a processor (or multiple processors) 710, which can be coupled to a communication component (or multiple communication components) 712 (for performing wireless communications).

The processor(s) 710 can also be coupled to a non-transitory machine-readable or computer-readable storage medium 714, which can store a PTT application 716 and regrouping communication instructions 708 executable by the processor(s) 710 to perform various tasks as discussed above.

The storage media 706 and 714 can be implemented with one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
communicating, by a network node, data of a first push-to-talk (PTT) group using a first multimedia broadcast/multicast service (MBMS) bearer, and data of a second PTT group using a second MBMS bearer; and
responsive to a regrouping of the first PTT group and the second PTT group to form a regrouped PTT group, communicating, by the network node, data of the regrouped PTT group using at least one of the first and second MBMS bearers, the first PTT group prior to the regrouping including first user equipments (UEs) that perform PTT communications using the first MBMS bearer, and the second PTT group prior to the regrouping including second UEs that perform PTT communications using the second MBMS bearer, and wherein the regrouped PTT group comprises the first UEs and the second UEs.

2. The method of claim 1, wherein the network node comprises an MBMS gateway, and wherein the communicating of the data comprises sending, by the MBMS gateway, the data to one or more wireless access network nodes.

3. The method of claim 1, wherein the network node comprises a wireless access network node, and wherein the communicating of the data comprises receiving, by the wireless access network node from an MBMS gateway, the data.

4. The method of claim 1, wherein at least one cell under control of a wireless access network node receives data for at least one of the first and second PTT groups, the method further comprising:
modifying, by the network node, a service area for a given MBMS bearer of the first MBMS bearer or the second MBMS bearer responsive to the regrouping of the PTT groups, wherein the modifying of the service area comprises removing the at least one cell under control of the wireless access network node from the service area for the given MBMS bearer to avoid duplicated delivery of data.

5. The method of claim 4, wherein the modifying of the service area causes cessation of delivery of data corresponding to the given MBMS bearer to the at least one cell.

6. The method of claim 4, wherein the modifying is responsive to a control message sent or received by the network node, and the control message comprises an information element settable to a first value indicating that MBMS session information over a Multicast Control Channel (MCCH) is to remain un-modified.

7. The method of claim 6, wherein the control message comprises an MBMS Session Update Request, and the information element is settable to a second value indicating that the MBMS session information over the MCCH is to be modified.

8. The method of claim 1, wherein the network node comprises a wireless access network node, the method further comprising:
sending, by the wireless access network node, the data of the regrouped PTT group over a wireless link to UEs using one of a Multimedia Broadcast Single Frequency Network (MBSFN) transmission or a single cell point-to-multipoint (PTM) transmission.

9. The method of claim 1, further comprising:
updating an MBMS bearer service or an MBMS session for a given PTT group of the first and second PTT groups to cause the MBMS bearer service or the MBMS session that initially did not deliver data of the other PTT group of the first and second PTT groups to begin delivering the data of the other PTT group, responsive to the regrouping.

10. The method of claim 1, further comprising:
sending, by the network node, a message to configure a single cell point-to-multipoint (PTM) transmission within a cell, the message including a group Radio Network Temporary Identifier (RNTI) that is specified for user equipments (UEs) participating in an MBMS session utilizing the single cell PTM transmission for a given MBMS bearer of the first MBMS bearer or the second MBMS bearer.

11. The method of claim 1, wherein the data of the regrouped PTT group includes:
first data redirected by a given PTT server of a first PTT server and a second PTT server to the other PTT server of the first and second PTT servers for delivery by the other PTT server to the network node, and
second data directly delivered by the given PTT server to the network node,
wherein the first data and the second data include packets provided with timestamps to allow synchronization of delivery of the packets.

12. A network node comprising:
at least one processor configured to:
communicate data of a first push-to-talk (PTT) group using a first multimedia broadcast/multicast service (MBMS) bearer, and data of a second PTT group using a second MBMS bearer; and
responsive to a regrouping of the first PTT group and the second PTT group to form a regrouped PTT group, communicate data of the regrouped PTT group using at least one of the first MBMS bearer and the second MBMS bearer, the first PTT group prior to the regrouping including first user equipments (UEs) that perform PTT communications using the first MBMS bearer, and the second PTT group prior to the regrouping including second UEs that perform PTT communications using the second MBMS bearer, and wherein the regrouped PTT group comprises the first UEs and the second UEs.

13. A given user equipment (UE) comprising:
a push-to-talk (PTT) application;
at least one processor configured to:
prior to regrouping of PTT groups including a first PTT group and a second PTT group, receive a data communication that is part of the first PTT group, wherein the first PTT group prior to the regrouping comprises first UEs including the given UE that perform PTT communications in the first PTT group, and the second PTT group prior to the regrouping comprises second UEs that perform PTT communications in the second PTT group, wherein the PTT communications performed by the first UEs in the first PTT group prior to the regrouping use a first multimedia broadcast/multicast service (MBMS) bearer, and the PTT communications performed by the second UEs in the second PTT group prior to the regrouping use a second, different MBMS bearer;

receive an indication responsive to the regrouping, the indication indicating that the first UEs including the given UE that are part of the first PTT group are to become members of the second PTT group, the second PTT group responsive to the regrouping including as members the first UEs and the second UEs;

send the indication to the PTT application to cause the PTT application to reconfigure PTT group information for the given UE; and responsive to the regrouping and after the PTT group information for the given UE has been reconfigured by the PTT application, receive a data communication of the second PTT group using the second MBMS bearer.

14. The given UE of claim 13, wherein the indication comprises a message carried over a Multicast Control Channel (MCCH), Multicast Traffic Channel (MTCH), or single cell PTM channel, the message comprising upper layer signaling information for a multimedia broadcast/multicast service (MBMS) service or MBMS session identified in the message.

15. The given UE of claim 13, wherein the at least one processor is configured to further:

receive a message to configure a single cell point-to-multipoint (PTM) transmission within a cell, the message including a group Radio Network Temporary Identifier (RNTI) that is specified for the UEs participating in a multimedia broadcast/multicast service (MBMS) session utilizing the single cell PTM transmission associated with the first PTT group.

16. The method of claim 1, wherein communicating the data of the regrouped PTT group using the at least one of the first and second MBMS bearers comprises communicating the data of the regrouped PTT group using the at least one of the first and second MBMS bearers that has been modified responsive to a request to modify an MBMS bearer.

17. The network node of claim 12, wherein the communicating of the data of the regrouped PTT group using the at least one of the first and second MBMS bearers comprises communicating the data of the regrouped PTT group using the at least one of the first and second MBMS bearers that has been modified responsive to a request to modify an MBMS bearer.

18. The network node of claim 12, wherein the data of the regrouped PTT group includes:

first data redirected by a first PTT server to a second PTT server for delivery by the second PTT server to the network node, and second data directly delivered by the first PTT server to the network node.

19. The method of claim 1, wherein at least one of the first UEs is different from each of the second UEs.

20. The network node of claim 12, wherein at least one of the first UEs is different from each of the second UEs.

21. The given UE of claim 13, wherein at least one of the first UEs is different from each of the second UEs.

* * * * *

UNITED STATES PATENT AND TRADEMARK OFFICE
CERTIFICATE OF CORRECTION

PATENT NO. : 9,955,321 B2
APPLICATION NO. : 14/681495
DATED : April 24, 2018
INVENTOR(S) : Takashi Suzuki, Eswar Vutukuri and Rene Faurie Page 1 of 1

It is certified that error appears in the above-identified patent and that said Letters Patent is hereby corrected as shown below:

Column 9:
Line 15, "IPMATNL_G1" should be --IPMA_TNL_G1--;
Line 24, "IPMAG2" should be --IPMA_G2--;

Column 16:
Line 16, "OCTETSTRING (512)," should be --OCTET STRING (512),--.

Signed and Sealed this
Second Day of October, 2018

Andrei Iancu
*Director of the United States Patent and Trademark Office*